(12) United States Patent
Oldenettel et al.

(10) Patent No.: US 11,179,667 B2
(45) Date of Patent: Nov. 23, 2021

(54) METHOD FOR THE TREATMENT OF AIR OF A COMPRESSED AIR SYSTEM

(71) Applicant: Continental Teves AG & Co. oHG, Frankfurt (DE)

(72) Inventors: Holger Oldenettel, Frankfurt (DE); Harald Schaumburg, Frankfurt (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 134 days.

(21) Appl. No.: 16/562,065

(22) Filed: Sep. 5, 2019

(65) Prior Publication Data

US 2019/0388827 A1 Dec. 26, 2019

Related U.S. Application Data

(63) Continuation of application No. PCT/EP2018/055928, filed on Mar. 9, 2018.

(30) Foreign Application Priority Data

Mar. 14, 2017 (DE) ...................... 10 2017 204 155.2

(51) Int. Cl.

| | | |
|---|---|---|
| *B01D 53/04* | (2006.01) | |
| *B01D 53/26* | (2006.01) | |
| *B60T 17/00* | (2006.01) | |
| *B60T 17/22* | (2006.01) | |
| *B60G 17/04* | (2006.01) | |

(52) U.S. Cl.
CPC ....... *B01D 53/0454* (2013.01); *B01D 53/261* (2013.01); *B60T 17/004* (2013.01);
(Continued)

(58) Field of Classification Search
CPC ...... F15B 21/04; F15B 21/048; B60T 17/004; B60T 17/221; B01D 53/0454; B01D 53/261; B01D 2259/4566; B60G 2600/66
See application file for complete search history.

(56) References Cited

U.S. PATENT DOCUMENTS

2003/0107191 A1 6/2003 Romer et al.
2009/0079155 A1 3/2009 Rehra et al.
(Continued)

FOREIGN PATENT DOCUMENTS

| CN | 1840994 A | 10/2006 |
|---|---|---|
| CN | 102943753 A | 2/2013 |

(Continued)

OTHER PUBLICATIONS

Search Report dated Feb. 27, 2018 from corresponding German Patent Application No. DE 10 2017 204 155.2.
(Continued)

*Primary Examiner* — Robert Clemente

(57) ABSTRACT

A method for the treatment of air of a compressed air system for a motor vehicle, the compressed air system comprising an air compressor, an air dryer and an ambient temperature sensor, wherein an exchange operation of a system air volume is performed by the air compressor, wherein during the exchange operation a part of the system air from the compressed air system is released into the surroundings and ambient air is filled into the compressed air system. The method includes determining a current ambient temperature value ($T_U$) using the ambient temperature sensor, checking a first condition, whether or not the current ambient temperature value ($T_U$) is lower than a temperature limit value ($T_G$), and performing the exchange operation to lower the dew point of the system air by the air dryer if the first condition is satisfied.

14 Claims, 2 Drawing Sheets

(52) U.S. Cl.
CPC ...... *B60T 17/221* (2013.01); *B01D 2253/106* (2013.01); *B01D 2259/4566* (2013.01); *B60G 17/0408* (2013.01); *B60G 2600/66* (2013.01)

(56) References Cited

U.S. PATENT DOCUMENTS

| | | | |
|---|---|---|---|
| 2011/0139263 A1 | 6/2011 | Hilberer | |
| 2011/0278804 A1 | 11/2011 | Folchert et al. | |
| 2014/0116400 A1 | 5/2014 | Jin | |
| 2017/0165605 A1* | 6/2017 | Minato | B60T 17/004 |

FOREIGN PATENT DOCUMENTS

| | | |
|---|---|---|
| CN | 106091175 A | 11/2016 |
| DE | 102005030726 A1 | 1/2007 |
| DE | 102008004807 A1 | 8/2008 |
| DE | 102008011543 A1 | 9/2009 |
| DE | 102009003396 A1 | 7/2010 |
| DE | 102012200412 A1 | 7/2013 |
| DE | 102012113188 A1 | 4/2014 |
| DE | 102014203396 A1 | 8/2015 |

OTHER PUBLICATIONS

International Search Report and Written Opinion dated Oct. 1, 2018 from corresponding International Patent Application No. PCT/EP2018/055928.
Chinese First Office Action dated Jun. 9, 2021 for the corresponding Chinese Application No. 201880017174.5.

* cited by examiner

METHOD FOR THE TREATMENT OF AIR OF A COMPRESSED AIR SYSTEM

CROSS REFERENCE TO RELATED APPLICATIONS

This application is a continuation of PCT International Application No. PCT/EP2018/055928, filed Mar. 9, 2018, which claims priority to German Patent Application No. DE 10 2017 204 155.2, filed Mar. 14, 2017, wherein the contents of the entirety of such applications are incorporated herein by reference.

TECHNICAL FIELD

A method for treating the air of a compressed air system.

TECHNICAL BACKGROUND

In known air suspension systems, air compressors are required for level regulation. These preferably dry-running compressors provide the pressures required for operation in the individual components, such as air springs or compressed air storage units. To this end, the compressors draw in ambient air by suction, compress it to a certain pressure level and feed it to the components of the system.

However, the intake ambient air contains water or moisture, which at low temperatures can cause individual components, such as valves, to freeze in operation. To prevent this from happening, by means of a desiccant/adsorbent, for example silica gel, the moisture present in the intake air is adsorbed in a dryer unit. The intake air therefore releases its moisture to the desiccant and is then directed, for example, into the air springs.

The moisture absorption of the adsorbent, however, is dependent on the temperature of the air. Silica gel provides a good water absorption at around 60° C. Above a certain point, the dryer is saturated and the adsorption agent can only fulfil its drying function to a limited extent.

By means of desorption, the dryer is regenerated. This means that the moisture contained in the adsorbent is absorbed using through-flowing air and released to the environment. In this process the air flows, for example, from a compressed-air storage through the dryer in counterflow and is released to the environment via a release valve.

In contrast to open compressed air systems, which constantly draw intake air from the surroundings and release it, in closed compressed air systems air is sucked in from the surroundings only if a significant pressure drop or a reduction in the system air volume has occurred due to leakage. Due to the permeability of air spring bellows a small leakage is always present, but this is very small.

If it is necessary to fill the closed compressed air system with ambient air, however, this minor air exchange can lead to problems due to a temperature drop from summer to winter. If the winter temperatures fall below the dew point of the system air, the moisture in the system begins to condense. At temperatures below 0° C., this can lead to freezing of solenoid valves and therefore to the failure of the air suspension system, for example.

DE 10 2009 003 396 A1 relates to a method for controlling the regeneration cycles for an air dryer of a closed level regulation system for vehicles. In this method, the volume of compressed air, as well as the ambient temperature and/or humidity, are measured when the closed-loop level control system is filled. There is always a sufficient quantity of compressed air passed through the dryer, that the latter, under the assumption of a maximum possible ambient temperature and/or humidity, is considered to be saturated. Thus for the regeneration of the dryer there is always a sufficient quantity of air available in the level control system. An active lowering of the dew point of the air volume present in the closed-loop level control system is not achieved with this method, which also means that the regeneration cycles occur relatively frequently.

SUMMARY

The method and apparatus described herein prevent freezing or a failure of components of a compressed air system and to avoid frequent regeneration cycles.

In one or more embodiments, a method is provided for the treatment of air of a compressed air system for a motor vehicle. The compressed air system includes an air compressor, an air dryer and an ambient temperature sensor, wherein an exchange operation of a system air volume is performed by the air compressor, wherein during the exchange operation a part of the system air from the compressed air system is released into the surroundings and ambient air is filled into the compressed air system. The method includes determining a current ambient temperature value ($T_U$) using the ambient temperature sensor, checking a first condition, whether or not the current ambient temperature value ($T_U$) is lower than a temperature limit value ($T_G$), and performing the exchange operation to lower the dew point of the system air by the air dryer if the first condition is satisfied.

In one or more embodiments, in the first condition, it is checked whether the current ambient temperature value ($T_U$) is lower than a temperature limit value ($T_G$) minus a first temperature offset value ($T_{O1}$).

In one or more embodiments, the exchange operation is carried out only when the speed of the motor vehicle exceeds a predefined speed limit value.

In one or more embodiments, in addition to the first condition, in a second condition it is checked whether the current ambient temperature value ($T_U$) is lower than the temperature limit value ($T_G$) minus a second temperature offset value ($T_{O2}$).

In one or more embodiments, in addition to the first condition, in a second condition it is checked whether the current ambient temperature value ($T_U$) is lower than the temperature limit value ($T_G$) minus a second temperature offset value ($T_{O2}$).

In one or more embodiments, the second temperature offset value ($T_{O2}$) is greater than the first temperature offset value ($T_{O1}$).

In one or more embodiments, if the second condition is satisfied, the exchange operation is performed when the motor vehicle drive is being operated.

In one or more embodiments, in addition to the first condition and the second condition, in a third condition it is checked whether a system pressure in the compressed air system falls below a limit.

In one or more embodiments, if the third condition is satisfied, a filling operation of the compressed air system is performed for leakage compensation.

In one or more embodiments, a modified temperature limit value ($T_{G\ new}$) is calculated as a function of the temperature limit value ($T_G$) and the current ambient temperature value ($T_U$) when an exchange operation or a filling operation for leakage compensation is performed.

In one or more embodiments, to calculate the modified temperature limit value ($T_{G\ new}$) a sliding average is formed.

In one or more embodiments, the temperature limit value ($T_G$) is replaced by the modified temperature limit value ($T_{G\ new}$).

In one or more embodiments, the temperature limit value ($T_G$) is stored in a non-volatile memory of a control unit.

In one or more embodiments, the temperature limit value ($T_G$) is set permanently to a specified initial temperature value ($T_{INIT}$) at the beginning of the method.

In one or more embodiments, a compressed air system comprises an air compressor, an air dryer and an ambient temperature sensor, wherein an exchange operation of a system air volume is performed by the air compressor, wherein during the exchange operation a part of the system air from the compressed air system is released into surroundings and ambient air is filled into the compressed air system. A current ambient temperature value ($T_U$) is determined using the ambient temperature sensor, a first condition is checked, the first condition comprises whether or not the current ambient temperature value ($T_U$) is lower than a temperature limit value ($T_G$), and the exchange operation is performed to lower the dew point of the system air by the air dryer if the first condition is satisfied.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

Figure 1:
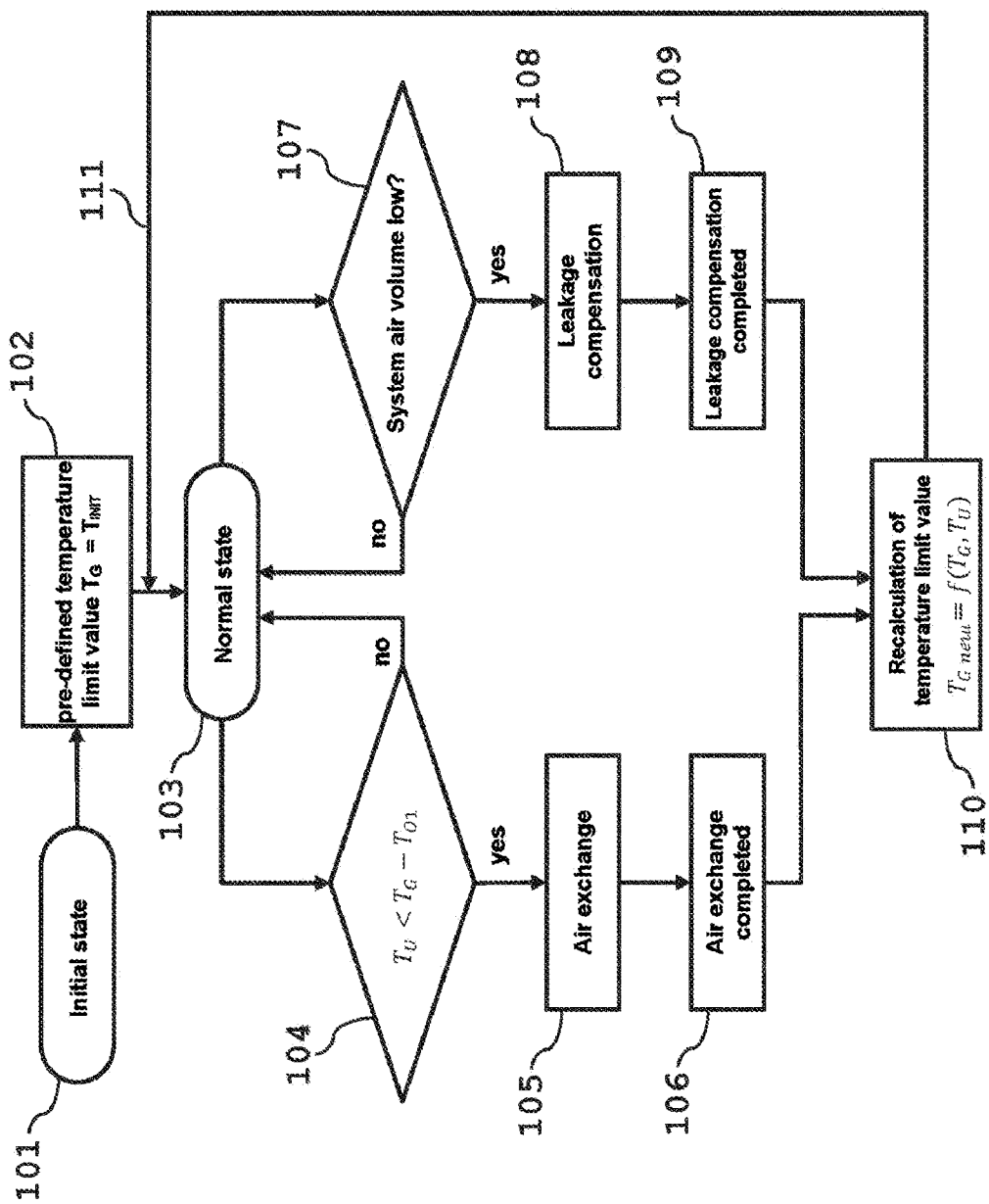
FIG. 1 a flow diagram of a method for air treatment in accordance with one or more embodiments, and FIG. 2 a flow diagram of a method for air treatment with one or more embodiments.

The flowchart in FIG. 1 shows a first exemplary method for treating the air of a compressed air system. The compressed air system can comprise an air compressor, an air dryer, a control unit and an environmental sensor. By means of the air compressor, air exchange operations 105 can be carried out, wherein a portion of the system air from the compressed air system is released into the surrounding area and the compressed air system is then filled with ambient air. By means of the air dryer, during filling of the compressed air system the dew point of the ambient intake air is lowered, because the desiccant contained in the dryer extracts the moisture from the intake air. In releasing part of the system air the air dryer is regenerated, by virtue of the fact that the air to be released absorbs the moisture contained in the desiccant and emits it into the environment.

Prior to being started by the vehicle driver, the compressed air system is first in a deliverable initial state 101. At this point, a temperature limit value is set to a predefined initial temperature value $T_{INIT}$. This initial value can be, for example, 25° C.

Thereafter, the motor vehicle is in use by the vehicle driver, and the compressed air system is therefore in a drive-enabled normal state 103. In this state, a constant, repeating first condition 104 is applied. Firstly, using the ambient temperature sensor, the currently prevailing ambient temperature $T_U$ is determined. In the first condition 104, a comparison is applied to determine whether the measured ambient temperature $T_U$ is lower than a threshold value. This threshold value is determined based on the temperature limit value $T_G$ and a first temperature offset value $T_{O1}$. The temperature offset value $T_{O1}$ can be, for example, around 20K. The temperature offset value $T_{O1}$ is deducted from the temperature limit value $T_G$. In other words, in the first condition 104, it is checked whether the currently measured ambient temperature value $T_U$ is lower than the temperature limit value $T_G$ minus the first temperature offset value $T_{O1}$.

If the first condition 104 is satisfied, the air exchange 105 is performed. By releasing part of the system air volume and drawing in ambient air at a lower temperature than the threshold value, ambient air with a low moisture content is brought into the compressed air system. This advantageously causes the dew point of the system air present in the compressed air system to decrease compared to the dew point before the exchange operation.

After the air exchange has been completed 106, a modified temperature limit value $T_{G\ new}$ is determined 110. The modified temperature limit value $T_{G\ new}$ is determined as a function of the temperature limit value $T_G$ and the last measured ambient temperature value $T_U$. The calculation can be carried out using a sliding averaging method. After the determination 110 of the modified temperature limit value $T_{G\ new}$, the old temperature limit $T_G$ is overwritten or replaced by the new modified temperature limit $T_{G\ new}$.

The constantly recurring first condition 104 is thus also based on a constantly recalculated threshold value, which changes after each exchange operation. Due to the fact that the exchange operation 104 is performed only when the ambient temperature $T_U$ is lower than the threshold value and the last measured ambient temperature $T_U$ is always input into the recalculation of the new threshold value, the threshold value is consistently reduced in falling ambient temperatures. Thus, in falling ambient temperatures the dew point of the system air is also reduced further and further.

If the ambient temperature $T_U$ is not below the threshold value in the test of condition 104, the compressed air system remains in the normal state 103. For increasing temperatures of the ambient air, a slight pressure drop also leads to a reduction in the system air volume. Also, in the course of the operation of the compressed air system, due to leakage a significant drop in pressure and a reduction in the system air volume can occur. Therefore, in the normal state 103, in addition to the test of the first condition 104, a third condition 107 for the system air volume is tested. In the third condition 107, a pressure sensor is used to check whether the system pressure has fallen below a threshold value, and the system air volume is thus too low. If the system air volume has been found to be too low, a filling operation for leakage compensation 108 is carried out. In this process, air is pumped from the surrounding area into the compressed air system by means of the air compressor. If the third condition 107 is satisfied, the current ambient temperature $T_U$ is also determined.

After the completion of the leakage compensation 109, in accordance with the calculation 110 a modified temperature limit value $T_{G\ new}$ is determined and the old temperature limit value $T_G$ is replaced by this value 111. If the third condition 107 is not satisfied, the compressed air system remains in the normal state 103.

The control unit of the compressed air system is suitable for carrying out the exemplary method. The tests of the first condition 104 and of the third condition 107 are repeated continuously. If one of the two conditions is satisfied and the air exchange 105 or the leakage compensation 108 is then to be performed, the control unit ensures that the other operation is not possible at this time.

Figure 2:
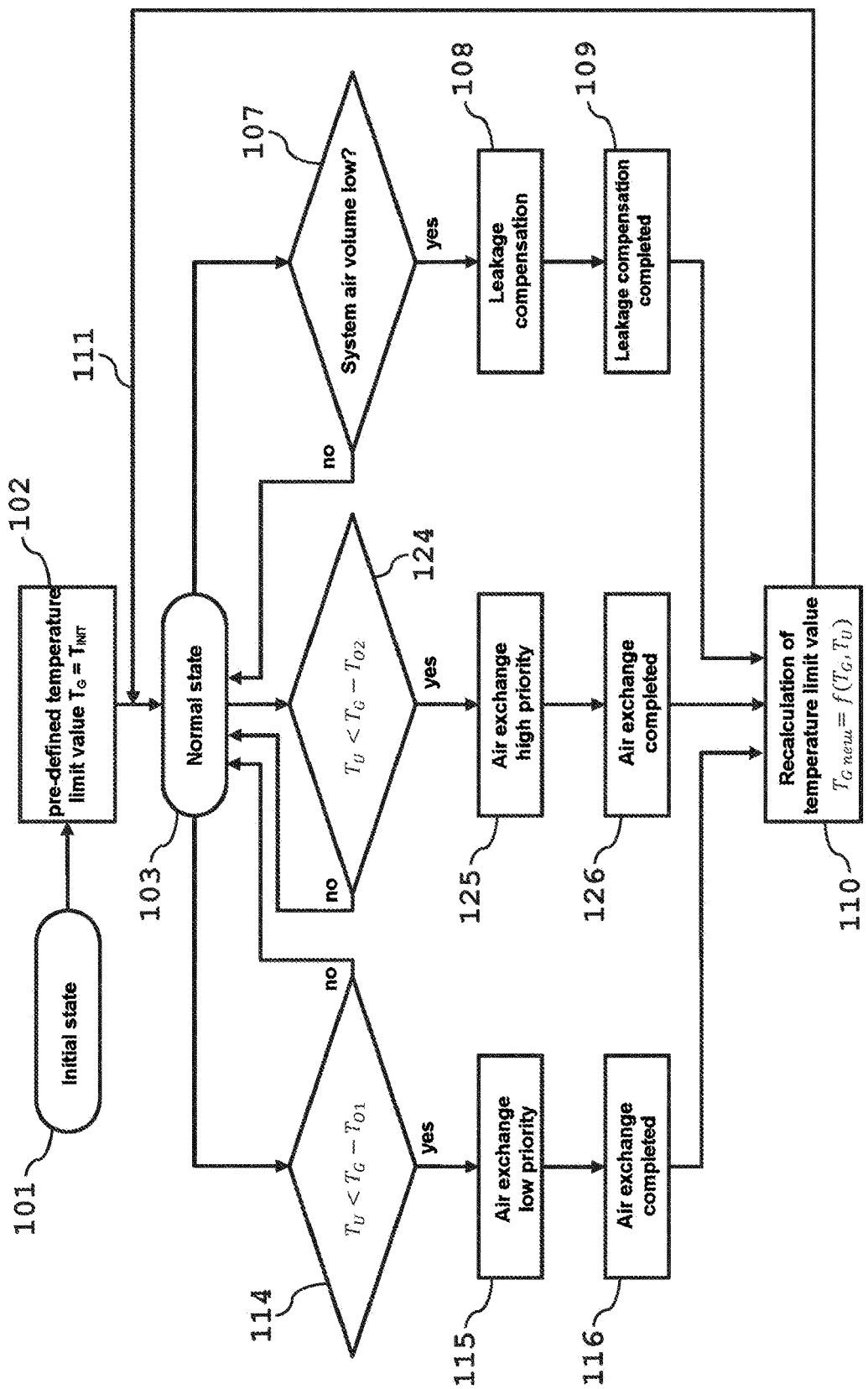

In a variation, in FIG. 2 a method for treating the air of a compressed air system is illustrated by the flow diagram shown therein.

In this case also, prior to being started by the vehicle driver, the compressed air system is firstly in a deliverable initial state 101, wherein a temperature limit value $T_G$ is set to a predefined initial temperature starting value $T_{INIT}$. Thereafter the motor vehicle is in use by the vehicle driver, and the compressed air system is therefore in a drive-enabled normal state 103.

In this state, a constant, recurring test of the first condition 114 is applied. This condition applies a threshold value formed by computing the temperature limit value $T_G$ minus a first temperature offset value $T_{O1}$. Temperature offset value $T_{O1}$ can be, for example, 20K. If the measured ambient temperature $T_U$ is below the threshold value based on the first offset value $T_{O1}$, an exchange operation with low priority 115 is performed only if the instantaneous speed of the motor vehicle exceeds a predefined speed threshold. This can be, for example, 50 km/h, so that the noise produced by the air compressor is not noticeable.

In addition to the first condition 114 a second condition 124 is applied. This condition is now based on a second temperature offset value $T_{O2}$, which can be, for example, 30K. The threshold value of the second condition 124 is therefore below the threshold value of the first condition 114. If the measured ambient temperature $T_U$ is below the threshold value based on the second offset value $T_{O2}$, an exchange operation with high priority 125 is performed when the motor vehicle drive is being operated and the air compressor is therefore available.

In other words, if the ambient temperature is extremely low, i.e. not only below the threshold value for the first condition 114 but also below the threshold value for the second condition 125, an exchange operation is performed which takes advantage of the very low moisture content in the ambient air in order to reduce the dew point of the system air. So that this advantage can be exploited, the exchange operation 125 is also carried out, for example, when the vehicle is stopped at a red traffic light.

The method also comprises the third condition 107 for determining the system air volume in accordance with the description of FIG. 1, and thus also the determination 110 of the modified temperature value $T_{G\ new}$ with subsequent overwriting 111 of the old temperature value $T_G$.

If the first condition 114, the second condition 124 or the third condition 107 are not satisfied, the compressed air system is in the normal state 103.

According to the invention, a method for the treatment of air of a compressed air system for a motor vehicle is provided, the compressed air system comprising an air compressor, an air dryer and an ambient temperature sensor, wherein an exchange operation of a system air volume is performed by means of the air compressor, wherein during the exchange operation a part of the system air from the compressed air system is released into the surroundings and ambient air is filled into the compressed air system with the following:

determining a current ambient temperature value by means of the ambient temperature sensor, checking a first condition, whether or not the current ambient temperature value is lower than a temperature limit value, and performing the exchange operation to lower the dew point of the system air by means of the air dryer if the first condition is satisfied.

In one or more embodiments, the compressed air system is designed as a closed compressed air system. In other words, it also comprises a compressed-air store and a plurality of air springs, wherein in the closed air supply operating mode the compressed air can be pumped back and forth between the compressed-air store and the air springs by means of the air compressor.

Advantageously, it has been found that at low temperatures less and less water/moisture is stored or present in the ambient air. An air exchange at low temperatures leads to a lowering of the dew point in the system air, because the intake air from the surroundings contains less water/moisture than at higher temperatures.

For example, in the transition period from summer to winter, with falling temperatures an air exchange is repeatedly induced, so that the dew point of the system air is gradually lowered. This ensures that even under large temperature fluctuations a condensation of moisture in the compressed air system is prevented. This protects, for example, the sensitive solenoid valves.

The method therefore also has the advantage that exchange operations only need to be performed rarely. An exchange operation is only performed when the ambient temperature falls below a threshold value. In this case, the threshold value can be calculated repeatedly after each completed exchange process on the basis of the previous threshold value and the currently measured ambient temperature.

In an exchange operation a uniform volume of system air (for example, 10 bar) is released from the compressed air system first and then the compressed air system is filled with ambient air.

In an exchange operation the dew point of the ambient intake air is lowered by means of the air dryer. When filling the compressed air system with ambient air, the desiccant contained in the dryer extracts the moisture from the system intake air, causing the dew point of the system air volume to steadily reduce after each exchange operation. When part of the system air is released, the dryer is then regenerated again by virtue of the fact that the air to be released absorbs the moisture contained in the desiccant and emits it into the environment.

It is checked in the first condition whether the current ambient temperature value is lower than a temperature limit value minus a first temperature offset value. The threshold value below which the current ambient temperature must fall is thus composed of the temperature limit value and the temperature offset value. Via the selection of the temperature offset value, the threshold can be significantly adjusted so that exchange operations are performed, for example, only in the event of large temperature differences.

According to an advantageous embodiment, the exchange operation is performed only when the speed of the motor vehicle speed exceeds a predefined speed threshold. This has the advantage that the noise produced by the air compressor during an exchange operation is not noticeable to the driver.

According to a further advantageous embodiment, in addition to the first condition, in a second condition it is verified whether the current ambient temperature value is lower than the temperature limit value minus a second temperature offset value. The second temperature offset value is greater than the first temperature offset value, in one or more embodiments. Therefore, on a temperature scale the threshold value of the second condition is below the threshold value of the first condition. If the second condition is satisfied, the exchange operation is performed when the motor vehicle drive is operating. This has the advantage that the exchange operation is also performed, for example, when the vehicle is stationary with the engine running. Because the ambient temperature for satisfying the second condition is lower than that necessary to satisfy the first condition, the method exploits the fact that during the exchange operation to be carried out the ambient air present has a very low moisture content. This means that the dew point of the system air can be reduced in a convenient way.

According to a further advantageous embodiment, in addition to the first condition and the second condition, in a third condition it is checked whether a system pressure in the compressed air system falls below a limit value. By means of a pressure sensor connected to the compressed air system, the system pressure of the compressed air system is determined continuously. If this pressure should fall below a specified limit value (e.g. 4 bar), then an excessively small system air volume or a leak can be inferred. If the third condition is satisfied, a filling process of the compressed air system is performed for leakage compensation. If this is the case, ambient air is filled into the compressed air system. If the third condition is satisfied, the current ambient temperature value is determined using the ambient temperature sensor.

According to a further advantageous embodiment, on satisfaction of the first, the second or the third condition, a modified temperature limit value is calculated as a function of the old temperature limit value and the current ambient temperature value. To calculate the modified temperature limit value a sliding average calculation is used. Thus, the threshold value of the first or second condition is steadily reduced with falling temperatures. To achieve this, the old temperature limit value is updated by the modified temperature limit value. If one of the three conditions is satisfied, or after an exchange operation/filling operation for leakage compensation, the ambient temperature is determined afresh. The ambient temperature value thus determined is combined with the old temperature limit value to calculate a modified temperature limit value. This modified temperature limit value is then fed into the constantly recurring test of the first and second condition.

According to a further advantageous embodiment, the temperature limit value is stored in a non-volatile memory of a control unit. This ensures that the temperature limit value for the first and the second condition remains present even after restarting the motor vehicle.

According to a further advantageous embodiment, the temperature limit value is set permanently to a specified initial temperature value at the beginning of the method. The temperature limit value is initially set to an initial temperature value in the factory delivery condition of the compressed air system, so that when the compressed air system is started up, the calculations of the first and second conditions can be carried out.

In one or more embodiments, the compressed air system remains in a normal condition if the first, the second or the third condition is not satisfied. Setting the threshold value undershoot of the first and the second condition ensures that no exchange operations are performed if the ambient temperature is too high and the dew point of the system air volume has been negatively modified with an exchange operation. This will also prevent too frequent exchange operations. This also applies to the filling operations for leakage compensation, which are only carried out if the system air volume present is actually too low.

The method is used in a compressed air system, for example in an air suspension system for a motor vehicle.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

LIST OF REFERENCE NUMERALS 101 initial state
102 predefined temperature limit value
103 normal state
104 first condition
105 air exchange
106 air exchange completed
107 third condition
108 filling operation for leakage compensation
109 leakage compensation completed
110 recalculation of temperature limit value
111 replace temperature limit value
114 first condition
115 air exchange with low priority
116 air exchange completed
124 second condition
125 air exchange with high priority
126 air exchange completed
$T_{INIT}$ initial temperature value
$T_G$ temperature limit value
$T_{G\ new}$ modified temperature limit value
$T_{O1}$ first temperature offset value
$T_{O2}$ second temperature offset value
$T_U$ ambient temperature value

The invention claimed is:

1. A method for the treatment of air of a compressed air system for a motor vehicle, the compressed air system comprising an air compressor, an air dryer and an ambient temperature sensor, wherein an exchange operation of a system air volume is performed by the air compressor, wherein during the exchange operation a part of the system air from the compressed air system is released into the surroundings and ambient air is filled into the compressed air system, the method comprising:
  determining a current ambient temperature value ($T_U$) using the ambient temperature sensor,
  checking a first condition, whether or not the current ambient temperature value ($T_U$) is lower than a temperature limit value ($T_G$), and performing the exchange operation to lower the dew point of the system air by the air dryer if the first condition is satisfied.

2. The method as claimed in claim 1, wherein in the first condition, it is checked whether the current ambient temperature value ($T_U$) is lower than a temperature limit value ($T_G$) minus a first temperature offset value ($T_{O1}$).

3. The method as claimed in claim 1, wherein the exchange operation is carried out only when the speed of the motor vehicle exceeds a predefined speed limit value.

4. The method as claimed in claim 1, wherein, in addition to the first condition, in a second condition it is checked whether the current ambient temperature value ($T_U$) is lower than the temperature limit value ($T_G$) minus a second temperature offset value ($T_{O2}$).

5. The method as claimed in claim 2, wherein, in addition to the first condition, in a second condition it is checked whether the current ambient temperature value ($T_U$) is lower than the temperature limit value ($T_G$) minus a second temperature offset value ($T_{O2}$).

6. The method as claimed in claim 5, wherein the second temperature offset value ($T_{O2}$) is greater than the first temperature offset value ($T_{O1}$).

7. The method as claimed in claim 4, wherein if the second condition is satisfied, the exchange operation is performed when the motor vehicle drive is being operated.

8. The method as claimed in claim 1, wherein, in addition to the first condition and the second condition, in a third condition it is checked whether a system pressure in the compressed air system falls below a limit.

9. The method as claimed in claim 8, wherein if the third condition is satisfied, a filling operation of the compressed air system is performed for leakage compensation.

10. The method as claimed in claim 1, wherein a modified temperature limit value ($T_{G\ new}$) is calculated as a function of the temperature limit value ($T_G$) and the current ambient temperature value ($T_U$) when an exchange operation or a filling operation for leakage compensation is performed.

11. The method as claimed in claim 10, wherein to calculate the modified temperature limit value ($T_{G\ new}$) a sliding average is formed.

12. The method as claimed in claim 10, wherein the temperature limit value ($T_G$) is replaced by the modified temperature limit value ($T_{G\ new}$).

13. The method as claimed in claim 1, wherein the temperature limit value ($T_G$) is stored in a non-volatile memory of a control unit.

14. The method as claimed in claim 1, wherein the temperature limit value ($T_G$) is set permanently to a specified initial temperature value ($T_{INIT}$) at the beginning of the method.

* * * * *